US009008970B2

(12) United States Patent
Donderici et al.

(10) Patent No.: US 9,008,970 B2
(45) Date of Patent: Apr. 14, 2015

(54) COMPENSATED CROSSWELL TOMOGRAPHY METHODS AND SYSTEMS (75) Inventors: Burkay Donderici, Houston, TX (US); Baris Guner, Houston, TX (US); Michael S. Bittar, Houston, TX (US); Luis E. San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/349,872

(22) PCT Filed: Oct. 6, 2011

(86) PCT No.: PCT/US2011/055020
§ 371 (c)(1),
(2), (4) Date: Apr. 4, 2014

(87) PCT Pub. No.: WO2013/052049
PCT Pub. Date: Apr. 11, 2013

(65) Prior Publication Data
US 2014/0244175 A1  Aug. 28, 2014

(51) Int. Cl.
*G01V 3/38* (2006.01)
*G01V 1/42* (2006.01)
(Continued)

(52) U.S. Cl.
CPC .. *G01V 3/38* (2013.01); *G01V 1/42* (2013.01); *G01V 3/18* (2013.01); *G01V 11/00* (2013.01); *G01V 2210/30* (2013.01); *G01V 2210/66* (2013.01)

(58) Field of Classification Search
CPC ........................................ G01V 3/28

USPC ............................................................ 702/7
See application file for complete search history.

(56) References Cited

U.S. PATENT DOCUMENTS 4,446,434 A   5/1984   Sternberg et al.
5,355,088 A   10/1994  Howard, Jr.
6,179,084 B1  1/2001   Yamamoto et al.
(Continued)

FOREIGN PATENT DOCUMENTS

WO   WO-2007/053251   5/2007
WO   WO-2012/005737   1/2012
(Continued)

OTHER PUBLICATIONS

Zhou, Qiang et al., "Audio-Frequency Electromagnetic Tomography in 2-D", Geophysics, Apr. 1993, pp. 482-495, vol. 58, No. 4, 8 Figs.
(Continued)

*Primary Examiner* — Bryan Bui
(74) *Attorney, Agent, or Firm* — Krueger Iselin LLP; Benjamin Fite (57) ABSTRACT A method and system to compensate for inaccuracies in crosswell tomography is presented. The method includes obtaining data from at least two receivers in response to transmissions from at least two transmitters. Next, at least one compensated value is derived based on the responses of the receivers to the transmitters. Finally, an inversion is performed based at least in part on the compensated value derived. This method eliminates inaccuracies that can be caused by sensor gain and phase variations in the inversion process. Inversion results with gain and phase compensation produce better imaging results that can better help determine the shape and boundaries of the reservoir.

17 Claims, 8 Drawing Sheets

(51) Int. Cl.
*G01V 3/18* (2006.01)
*G01V 11/00* (2006.01)

(56) References Cited

U.S. PATENT DOCUMENTS

| | | | |
|---|---|---|---|
| 6,538,447 | B2 | 3/2003 | Bittar |
| 6,703,838 | B2 | 3/2004 | Conti |
| 6,777,940 | B2 | 8/2004 | Macune |
| 6,791,331 | B2 | 9/2004 | Conti |
| 7,030,617 | B2 | 4/2006 | Conti |
| 7,046,581 | B2 | 5/2006 | Calvert |
| 7,801,681 | B2 | 9/2010 | Pavlov et al. |
| 7,852,087 | B2 | 12/2010 | Wilt et al. |
| 7,881,911 | B2 | 2/2011 | Kim et al. |
| 8,131,526 | B2 | 3/2012 | Neville |
| 8,401,796 | B2 | 3/2013 | Morikami et al. |
| 8,456,166 | B2 * | 6/2013 | DePavia et al. ............... 324/338 |
| 2002/0000808 | A1 * | 1/2002 | Nichols ......................... 324/339 |
| 2003/0023381 | A1 | 1/2003 | San Martin |
| 2004/0145370 | A1 | 7/2004 | Conti |
| 2009/0005992 | A1 | 1/2009 | Alumbaugh et al. |
| 2010/0198519 | A1 | 8/2010 | Wilt et al. |

FOREIGN PATENT DOCUMENTS

| | | |
|---|---|---|
| WO | WO-2012/064342 | 5/2012 |
| WO | WO-2013/052049 | 4/2013 |

OTHER PUBLICATIONS

Lo, T.W. et al., "The Benefit and Reliability of Using Cross-Well Tomography for Reservoir Characterization", SPE 22752, 66th Annual Technical Conference and Exhibition of the Society of Petroleum Engineers held in Dallas, TX, U.S.A., (Oct. 6-9, 1991), pp. 927-936.

Marsala, Alberto F., et al., "Crosswell Electromagnetic Tomography: from Resistivity Mapping to Interwell Fluid Distribution", IPTC 12229, International Petrleum Technology Conference held in Kuala Lumpur, Malaysia, (Dec. 3-5, 2008), pp. 1-6.

Marsala, Alberto F., et al., "Crosswell Electromagnetic Tomography in Haradh Field: Modeling to Measurements", SPE 110528, 2007 SPE Annual Technical Conference and Exhibition held in Anaheim, CA, U.S.A., (Nov. 11-14, 2007), pp. 1-7.

PCT International Search Report and Written Opinion, dated Feb. 1, 2012, Appl No. PCT/US2011/055020, "Compensated Cross-Well Tomography Methods and Systems", filed Oct. 6, 2011, 8 pgs.

PCT International Preliminary Report on Patentability, dated Nov. 29, 2013, Appl No. PCT/US2011/055020, "Compensated Cross-Well Tomography Methods and Systems," filed Oct. 6, 2011, 8 pgs.

AU Examination Report No. 2, dated Feb. 10, 2015, Appl No. 2011378454, "Compensated Cross-Well Tomography Methods and Systems", filed Oct. 6, 2011, 3 pgs.

EP Extended Search Report, dated Dec. 15, 2014, Appl No. 11873738.6, "Compensated Cross-Well Tomography Methods and Systems," Filed Oct. 6, 2011, 6 pgs.

\* cited by examiner

COMPENSATED CROSSWELL TOMOGRAPHY METHODS AND SYSTEMS

BACKGROUND

Modern oil field operations demand a great quantity of information relating to the parameters and conditions encountered downhole. Among the types of desired information is the extent and distribution of fluids in the reservoir formations. While it is possible to glean a general picture with surface surveys, such surveys are limited by the effects of the subsurface layers overlying the region of interest. Such effects can be eliminated or reduced by the use of boreholes in or near the region of interest. With a suitable arrangement of borehole transmitters and receivers, crosswell tomography can be used to extract a comparatively detailed image of the region of interest, suitable for planning and monitoring production from a reservoir.

Initially, crosswell tomography was performed using seismic transmitters and receivers, but more recently the focus has been on the use of electromagnetic (EM) transmitters and receivers. As with any geophysical survey, noise and inaccuracies in the survey system will negatively impact image quality. One important cause of this degradation in crosswell tomography is mismatches between assumed and actual values for sensor gains and phases. These mismatches can result from a number of causes including differences in sensor types, calibration errors, variation in borehole configurations (e.g., mud composition and borehole radius), and environmental parameters such as temperature and pressure. Phase mismatches can be caused or exacerbated by latencies in electronic systems and synchronization errors for the widely-distributed components of a typical crosswell tomography system. Traditional methods crosswell tomography do not appear to adequately address such inaccuracies.

While the invention is susceptible to various alternative forms, equivalents, and modifications, specific embodiments thereof are shown by way of example in the drawings and will herein be described in detail. It should be understood, however, that the drawings and detailed description thereto do not limit the disclosure, but on the contrary, they provide the foundation for one of ordinary skill to discern the alternative forms, equivalents, and modifications that are encompassed with the described embodiments by the scope of the appended claims.

DETAILED DESCRIPTION

The issues identified in the background are at least in part addressed by the disclosed compensated crosswell tomography methods and systems. In at least some method embodiments, data is obtained from at least two receivers in response to each of at least two transmitters, the transmitters and receivers being located in boreholes near the region of interest. The data is combined to form at least one compensated value that compensates for any transmitter and receiver gain or phase inaccuracies. An inversion is then performed to identify the subsurface structure that best matches these compensated values. At least some system embodiments implement this method using software that then outputs one or more images derived from the subsurface structure.

Figure 1:
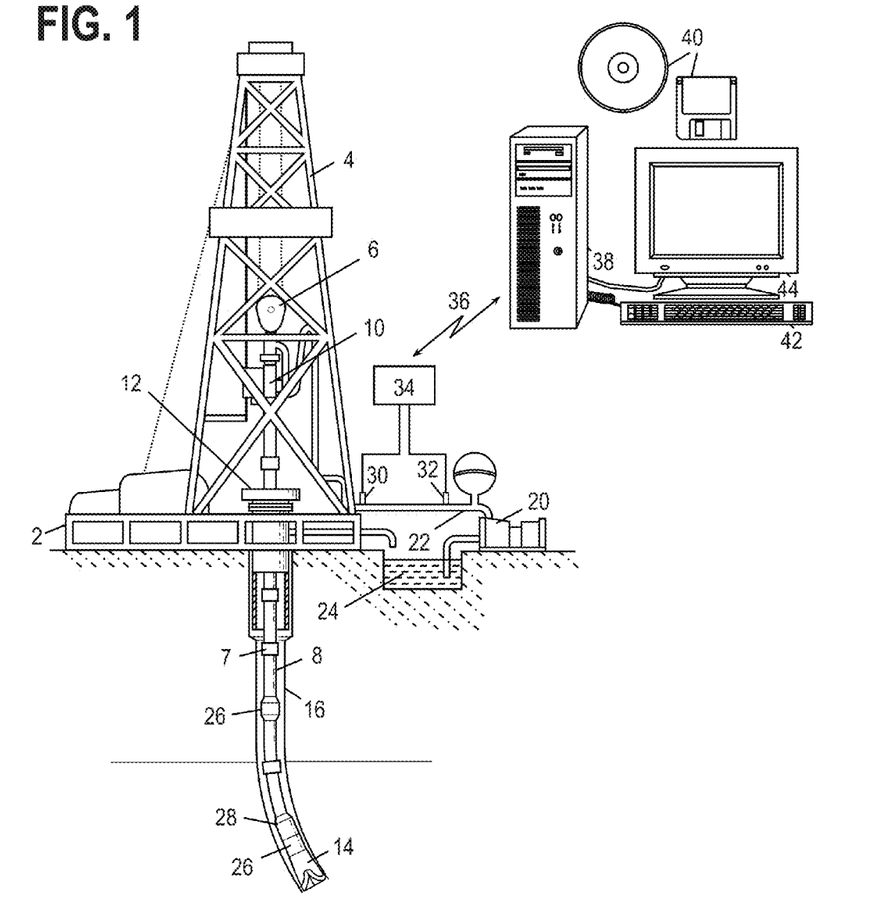
FIG. 1 shows an illustrative drilling environment.

The disclosed systems and methods employ at least one borehole in or near the subsurface region of interest. Such boreholes may be drilled as illustrated in FIG. 1. A drilling platform 2 is equipped with a derrick 4 that supports a hoist 6 for raising and lowering a drill string 8. The hoist 6 suspends a top drive 10 that is used to rotate the drill string 8 and to lower the drill string through the well head 12. Sections of the drill string 8 are connected by threaded connectors 7. Connected to the lower end of the drill string 8 is a drill bit 14 that rotates to create and extend a borehole 16 along a desired path 18. A pump 20 circulates drilling fluid through a supply pipe 20 to top drive 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the integrity of the borehole 20.

Logging instruments 26 may be positioned on the drill string 8. A telemetry module 28 may provide communication between the logging instruments 26 and a surface interface 34 using any one of various available telemetry technologies. In one example, acoustic sensors 30 and 32 detect mud pulse telemetry carrying data from the logging instruments. A data processing system 38 is coupled to the surface interface 34 by a wired or wireless communications link 36 to control and acquire measurements from the logging instruments 26. The illustrated data processing system 38 is a general purpose computer with one or more input devices 42 and one or more output devices 44 for interacting with a user. Software on information storage media 40 (or in the computer's internal memory) configures the computer's internal processor(s) to acquire crosswell tomography measurements and derive a model of the subsurface structure for display to the user.

Logging instruments 26 preferably include acoustic transducers for sending and/or receiving acoustic signals, or electromagnetic antennas for sending and/or receiving electromagnetic ("EM") signals. Though illustrated on a drill string, the logging instruments can additionally be conveyed on a wire line or a coiled tubing string. Data processing system 38 acquires measurements using multiple transmitters and receivers in various positions in and around the region of interest.

Figure 2A:
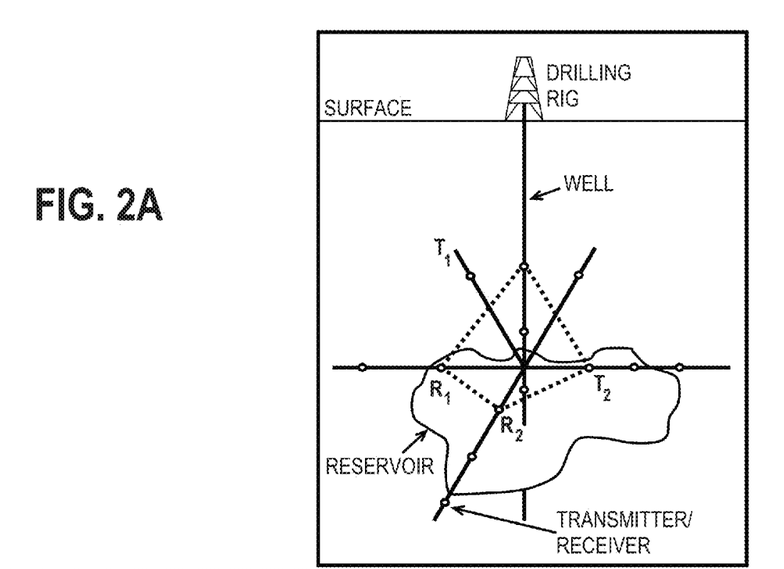
FIG. 2A shows an illustrative multilateral environment for crosswell tomography.
Figure 2B:
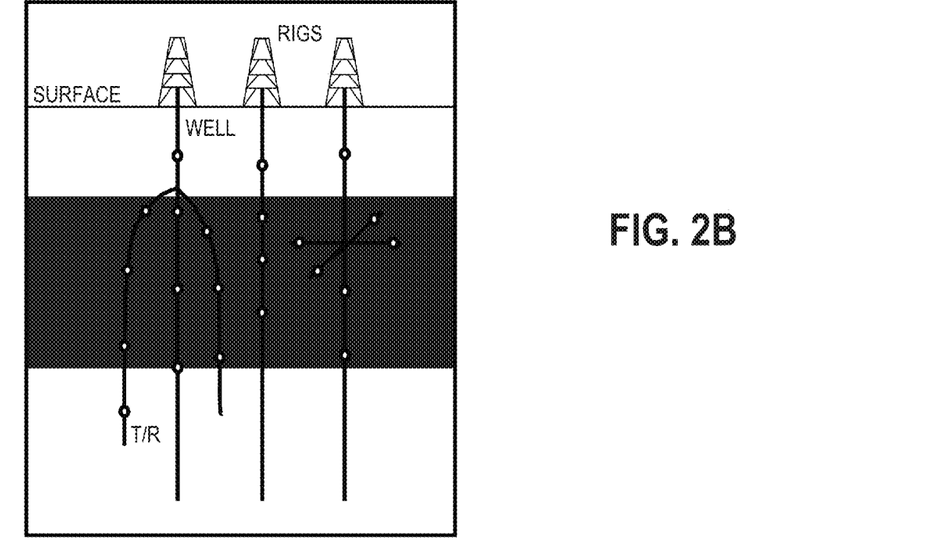
FIG. 2B shows an illustrative multiple borehole environment for crosswell tomography.

FIG. 2A shows an illustrative configuration in which various transmitters ("T") and receivers ("R") are positioned in each of the branches of a multilateral well, including a substantially vertical branch penetrating the region of interest and five substantially horizontal branches extending outward in various directions along the top of the reservoir. FIG. 2B shows a different illustrative configuration in which multiple transceiver (transmitter and receiver) nodes are positioned throughout a region of interests using multiple vertical wells, some of which may include lateral branches having additional transceiver nodes. Some or all of the boreholes may be open (i.e., uncased). Similarly, some or all of the boreholes may be cased and the sensors positioned inside the casing. Where the casing causes too much attenuation, the sensors may be configured to send/receive low frequency magnetic waves. Some systems may employ additional sensors positioned at the surface.

The number and position of the nodes depends on the region's volume, properties (resistivity or acoustic impedance), and the desired resolution of the model. Generally, however, a greater number of nodes offers better model accuracy, and a three dimensional arrangement of nodes may be preferred to a two dimensional arrangement, which in turn may be preferred to a one dimensional arrangement. Where some of the nodes are spaced too far from the region of interest to be useful, they may be omitted to avoid introducing unnecessary noise into the inversion process.

Figure 3:
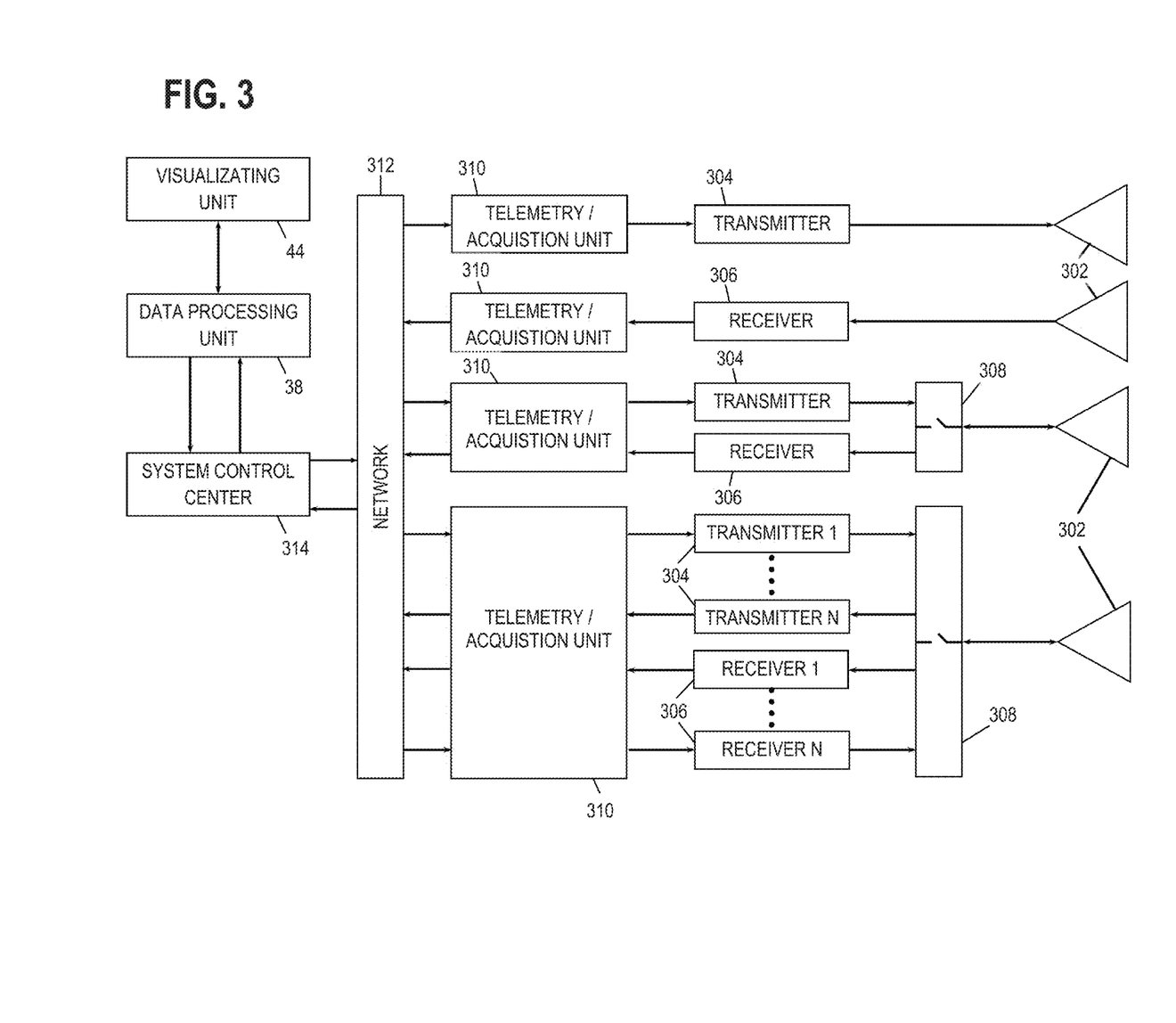
FIG. 3 is a function block diagram of an illustrative compensated crosswell tomography system.
Figure 4A:
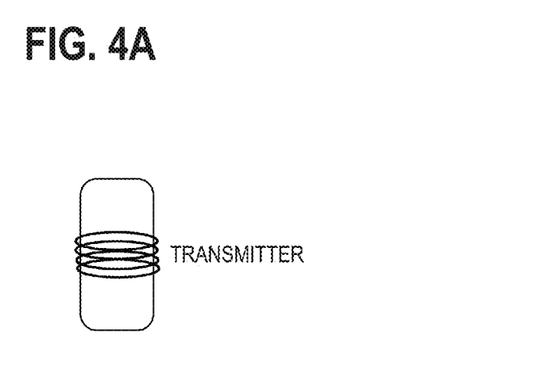
FIGS. 4A and 4B shows illustrative configurations for electromagnetic (EM) transmit and receive antennas.
Figure 4B:
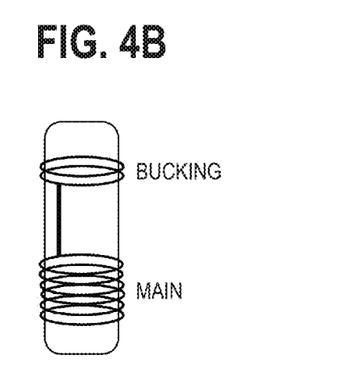

FIG. 3 is a function block diagram of a compensated crosswell tomography system. Each of the nodes in FIGS. 2A-2B includes at least one sensor 302 for transmitting and/or receiving acoustic or EM signals. For an EM system the sensors are antennas or magnetometers. Suitable antenna configurations include a coil antenna (see, e.g., FIG. 4A) with an optional bucking coil (see, e.g., FIG. 4B), a toroidal antenna, an electrical gap antenna, a spaced-electrode antenna, and a horn antenna. For an acoustic system, the suitable sensors include piezoelectric transducers, magnetic coil speakers, bender bars, and conventional seismic sources.

Some of the sensors are coupled to a transmitter 304 to transmit signals into the formation, some are coupled to a receiver 306 to receive signals from the formation, some are switchable between transmit and receive mode. In the latter case, a switch 308 may be provided between the sensor 302 and its associated transmitter 304 and receiver 306. Some embodiments may even provide multiple transmitters and receivers for at given sensor, e.g., for different signal frequencies. Conversely, the system may include multiple sensors 302 coupled to a given transmitter 304 or receiver 306, e.g., to enable the transmitter or receiver to send or receive signals in different directions or polarizations. Tilted antennas are contemplated for making measurements of orthogonal or linearly independent EM signal components.

Each node includes a telemetry unit 310 that controls the associated transmitters 304 and receivers 306 (and switches 308) in accordance with commands from a system control center 314. A network 312 couples the control center 314 to the various nodes via conventional wired or wireless communication links to the well head of each well in the system, and an interface unit at each well head completes the communications chain via an intrawell telemetry channel such as a wireline, an electromagnetic telemetry link, an acoustic telemetry link, or a mud pulse telemetry technique. Any suitable configuration can be used for network 312.

During normal operation, the control center 314 iterates through each of the available transmitters 304, causing them to fire in turn while all of the other nodes are set to detect and capture any resulting receive signal. The telemetry units 310 capture the receiver signals for each transmitter firing and communicate them to the control center 314. Such measurements may be repeated and combined to improve signal to noise ratio. The data processing unit 38 acquires the set of receiver responses to each transmitter firing and processes them as outlined below to produce a model of the subsurface structure. A user can view and interact with the model via a visualization unit 44.

Figure 5:
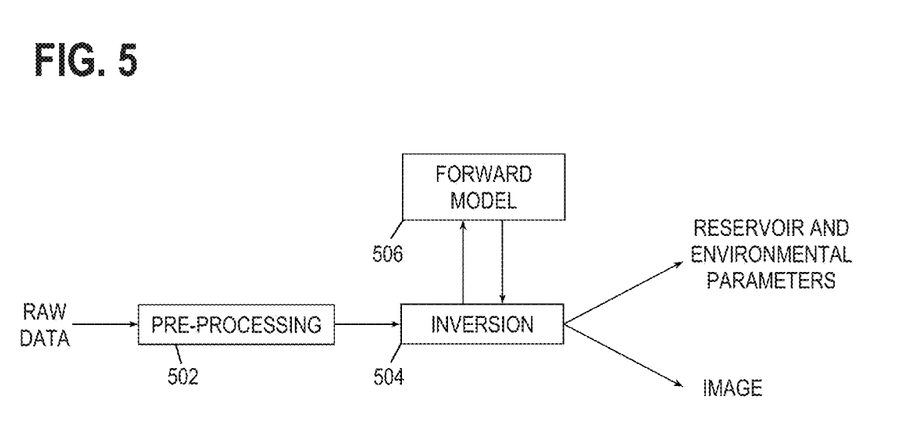
FIG. 5 is a high-level flow diagram of an illustrative inversion process.

FIG. 5 shows a high-level block diagram of an inversion process. Raw data (the amplitude and phase of each receiver's responses to each transmitter) is processed in block 502 to obtain compensated data. In block 504, an iterative inversion process adapts a structural model of the region of interest until the compensated data are matched by predicted data. A forward model block 506 generates the predicted data based on the current structural model, and the inversion block responsively adapts the structural model until the error between the predicted and compensated data values falls below a threshold. The adapted structural model is then output by block 504 for visualization and/or analysis to determine the amount and distribution of fluids in the reservoir.

The compensated data is formed by constructing ratios of the raw data. These ratios are designed to compensate for any systematic errors in the transmit/receive characteristics of the various sensors. Because of this compensation, the results of the inversion process are much improved relative to those of an inversion process performed directly on the raw data. Moreover, this approach relaxes system design constraints, enabling the use of a variety of sensor types, and operation in diverse borehole and environmental circumstances. The synchronization requirements are relaxed, and the system can more easily accommodate miscalibration or parameter drift of the sensors.

Let $V_{ij}'$ be a complex value representing the amplitude and phase of a signal measurement by receiver i in response to transmitter j. Let it be related to the "true" signal measurement $V_{ij}$ by:

$$V_{ij}' = c_i c_j V_{ij},$$

where $c_i$ and $c_j$ are complex values representing the gain and phase errors between the actual and assumed characteristics of receiver i and transmitter j. These errors can be eliminated by combining this measurement with the measurement of receiver i in response to a second transmitter m, and the measurements of a second receiver k to both transmitters j and m to form a compensated value $P_{ikjm}$:

$$P_{ikjm} = \frac{V_{ij}' V_{km}'}{V_{im}' V_{kj}'} = \frac{c_i c_j V_{ij} c_k c_m V_{km}}{c_i c_m V_{im} c_k c_j V_{kj}} = \frac{V_{ij} V_{km}}{V_{im} V_{kj}}$$

Note the cancellation of the gain and phase errors. If the system includes a total of T transmit antennas and a total of R receive antennas, there are a total of $T!/(2(T-2)!)$ transmitter pairs and a total of $R!/(2(R-2)!)$ receiver pairs, yielding up to $T!R!/(4(T-2)!(R-2)!)$ compensated values. For a system with T=4 and R=16, there would be up to 64 measurements from which up to 720 compensated values could be calculated. In practice the measurements may be made at multiple frequencies, further increasing the number of measurements to be matched in the inversion process.

Figure 6:
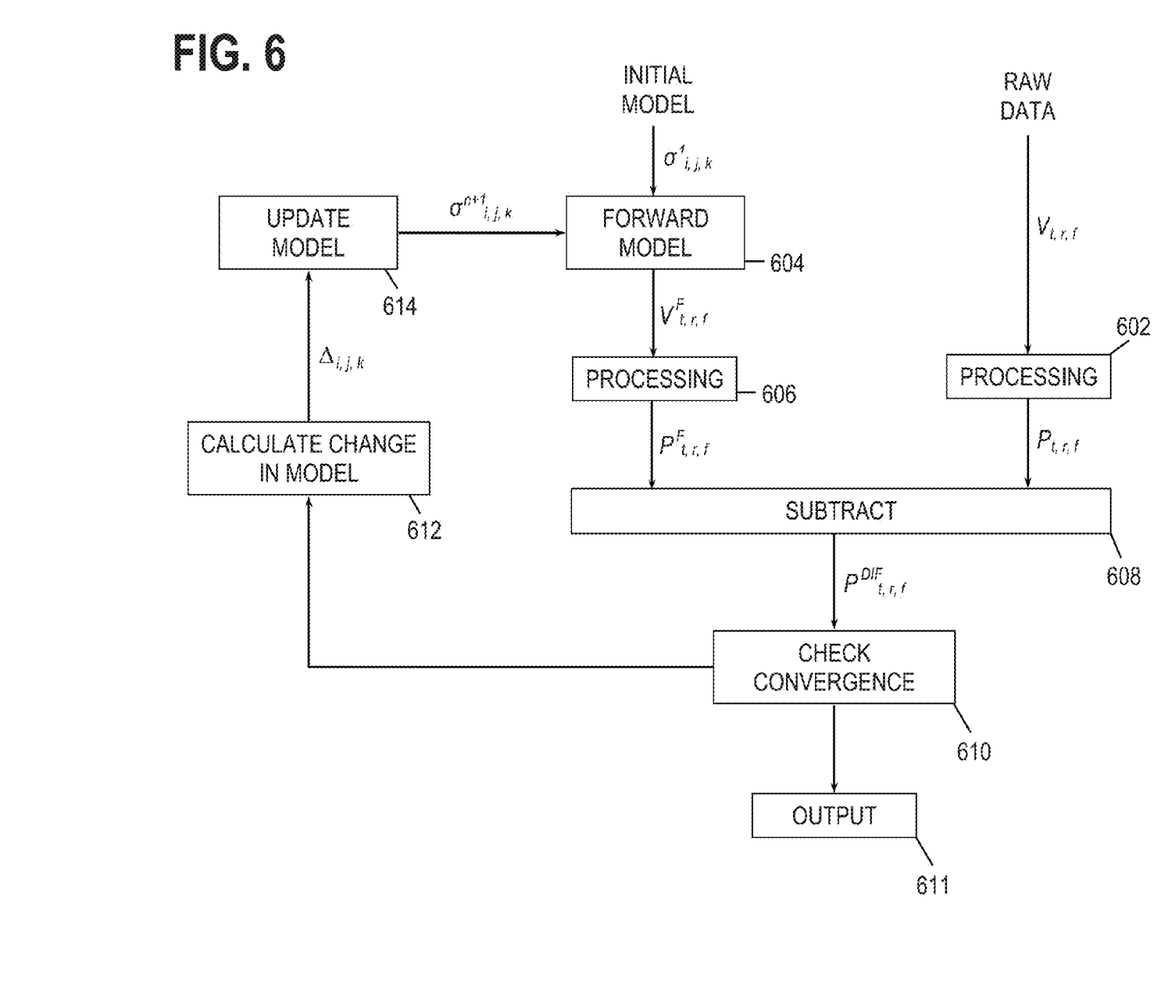
FIG. 6 is a detailed flow diagram of an illustrative inversion process.

FIG. 6 is a more detailed block diagram of an inversion process. The raw data is denoted as $v_{t,r,f}$ where t, r and f in the subscript represent a particular transmitter, receiver and frequency, respectively. Once raw data is obtained, it is passed through an initial processing stage to obtain the compensated data $p_{t1,t2,r1,r2,f}$. Note that prior to determining the compensated values, some embodiments normalize the raw data with respect to measurements predicted by an assumed (perhaps constant resistivity) background model. Such normalization may be useful for reducing the dominance of strong signal channels in the inversion process.

A parallel track in FIG. 6 begins with an initial model of the subsurface structure in the region of interest, represented in the figure by the conductivity values $\sigma_{i,j,k}^1$, where the superscript indicates an iteration number and i, j, k represent spatial indices in the x, y, and z directions for cells in the conductivity grid. The conductivity grid needs to be chosen large enough to cover the region of interest and other features that might affect the measurements. A forward model 604 operates on the model to predict the signal measurements for every transmitter-receiver combination and frequency using an initial guess for the formation conductivity. The predicted data due to this conductivity profile (denoted as $v_{t,r,f}^F$) are processed by a block 606 that performs the same operations as block 602. The output of block 606 is denoted $p_{t1,t2,r1,r2}^F$. Block 608 determines the difference between the outputs of blocks 602 and 608, producing $p_{t1,t2,r1,r2,f}^{DIF}$. Block 610 evaluates the magnitude of this difference to determine whether the model has converged. In some embodiments, convergence is determined by comparing the magnitude of the difference to the magnitude of compensated data $p_{t1,t2,r1,r2,f}$, e.g., testing whether $\|\bar{P}^{DIF}\| \leq c\|\bar{P}\|$, where $\bar{P}^{DIF}$ and $\bar{P}$ are vectors whose elements are producing $p_{t1,t2,r1,r2,f}^{DIF}$ and $p_{t1,t2,r1,r2,f}$, respectively and c is a constant. If convergence is satisfied, the block 611 outputs the conductivity model. Otherwise, block 612 derives a set of changes for the conductivity model based on $p^{DIF}$ and block 614 applies the changes to the conductivity model to arrive at an updated model $\sigma_{i,j,k}^{n+1}$ for iteration step n.

Figure 7:
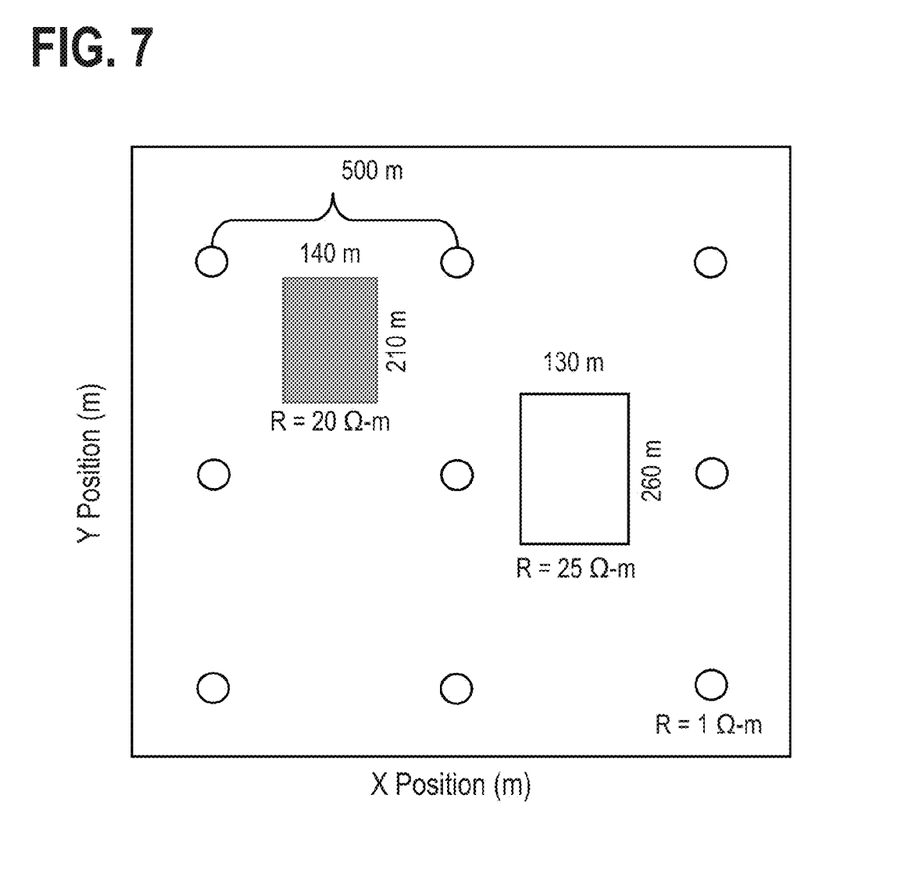
FIG. 7 shows an illustrative reservoir model for simulation.

FIG. 7 shows a top view of a simulation model for comparing the performance of the disclosed method to a tomography method that fails to compensate the raw data. The simulation model is a formation bed with nine vertical boreholes each having a transceiver positioned 70 meters above the bottom of the formation bed. The boreholes are evenly spaced apart by 500 meters in X and Y directions. The formation bed is assumed to have two resistive anomalies in an otherwise homogeneous medium of 1 Ω-m resistivity. Both anomalies have a thickness of 65 m in z-direction. If the middle transceiver is taken as the origin, the first anomaly is the volume defined between 155 m and 285 m in x-direction, and −130 to 130 m. in y-direction. This anomaly has a resistivity of 25 Ω-m. The second anomaly is defined between −290 and −150 m in x-direction and 120 and 330 m in y-direction. Resistivity of this anomaly is taken as 20 Ω-m. A multi-frequency system with z-directed coil transmitters was considered with operating frequencies of 1, 2, 5 and 10 Hz. Synthetic data was created with a 3-D finite difference time domain (FDTD) code according to the conductivity profile described above. A 5% multiplicative gain noise was applied to the synthetic data.

Figure 8:
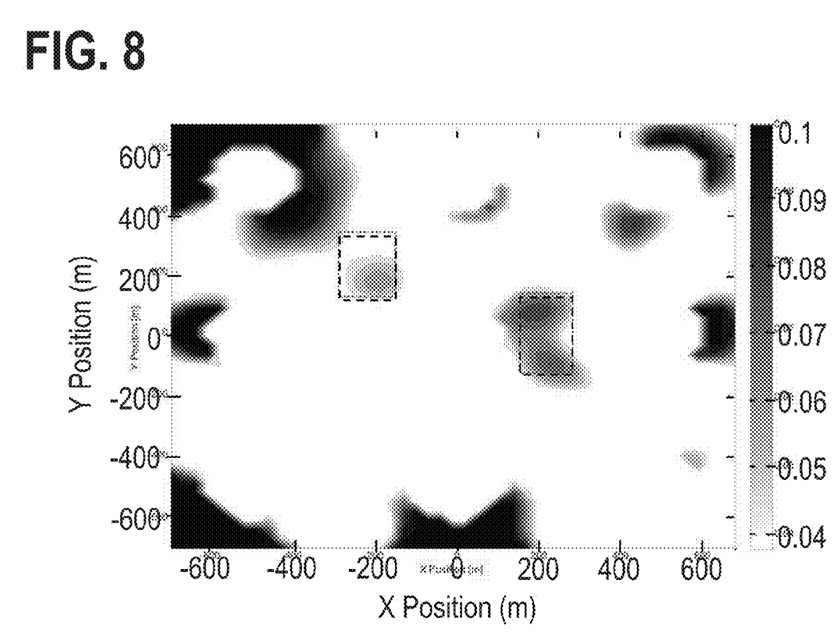
FIG. 8 shows traditional inversion results for the illustrative simulation.

The results from the traditional inversion of this data are shown in FIG. 8. The true locations of the anomalies are indicated with dashed lines. The inverted image exhibits severe artifacts due to noise. Although several peaks close to the targets are observed, results also show many false positives and it is not possible to reliably determine the shape and boundaries of the reservoir.

Figure 9:
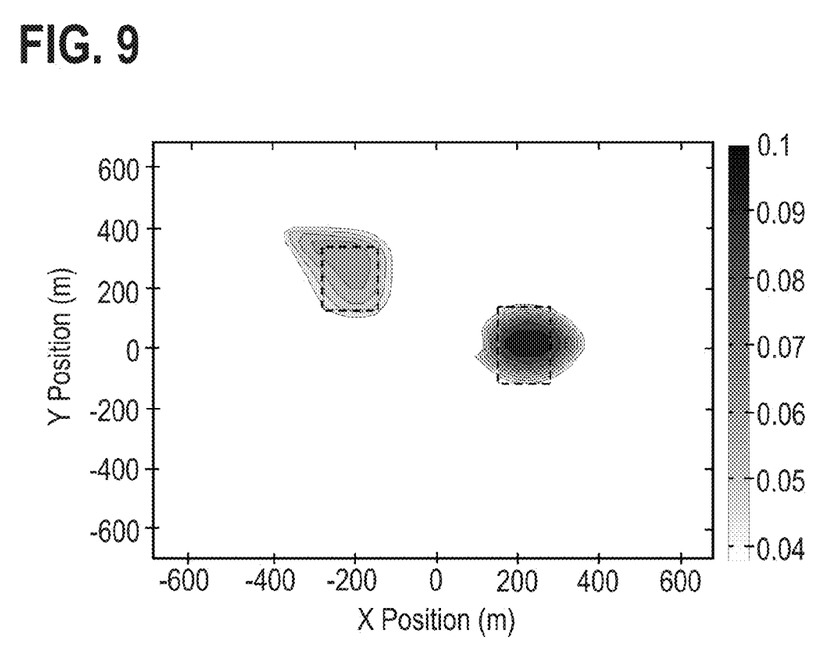
FIG. 9 shows compensated inversion results for the illustrative simulation.

The results from inversion using compensated values in accordance with the method disclosed above are shown in FIG. 9. The conductivity image is unaffected by the presence of sensor gain and phase errors. It can be seen that higher intensity regions match very accurately with reservoir boundaries and any false positives occurring due to sensor gain and phase noises are eliminated.

Figure 10:
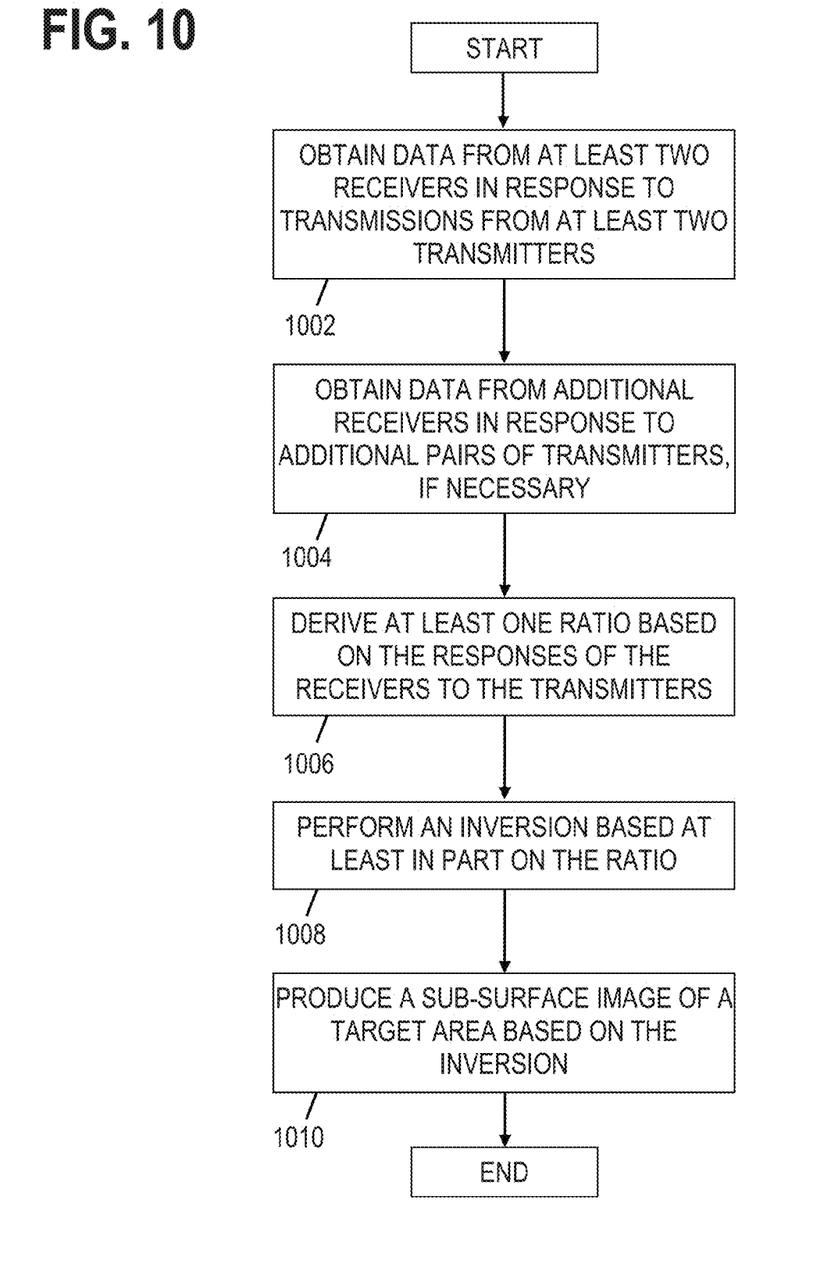
FIG. 10 is a flow diagram of an illustrative compensated crosswell tomography method.

FIG. 10 shows an illustrative flow diagram for compensated crosswell tomography. In block 1002, data is obtained from at least two receivers in response to transmissions from at least two transmitters. At least one of the receivers or transmitters are located inside a borehole. The transmitters and receivers can also be distributed among two or more boreholes and on the surface. In block 1004, data is obtained from additional pairs of receivers in response to additional pairs of transmitters. In block 1006, at least one compensated value is derived based on the responses of the receivers to the transmitters. The compensated value is expressible as:

$$\frac{V'_{ij} V'_{km}}{V'_{im} V'_{kj}},$$

where i and k are receiver indices and j and m are transmitter indices. An inversion is performed based at least in part on the derived compensated value(s), as shown in block 1008. Finally, in block 1010, a sub-surface image of a target area is produced based on the inversion. The image can provide information about at least one formation property, such as acoustic velocity, attenuation, seismic reflectivity, electromagnetic resistivity, or electrical permittivity.

The operations represented in FIG. 10 can be implemented as software on a general purpose computer. The processor(s) in such a computer are configured to execute software stored on disk or in memory, the software causing the processors to obtain the data, process it, and display resulting images in accordance with user commands.

One of ordinary skill, upon reviewing the foregoing disclosure, will recognize various alternative forms, equivalents, and modifications to disclosed elements and operations. For example, the compensated measurement formula is not the only one that yields cancellation of the gain and phase errors, as combinations of measurements by three receivers in response to three transmitters, or four receivers in response to four transmitters, etc, will yield similar cancellations. Where possible, the following claims embrace such alternative forms, equivalents, and modifications.

What is claimed is:

1. A method for improving image quality of crosswell tomography, comprising:
    obtaining data from at least two receivers in response to transmissions from at least two transmitters, wherein the transmitters and receivers are distributed among two or more boreholes;
    deriving at least one compensated value that combines the data from the at least two receivers' responses to the at least two transmitters as a ratio that cancels errors between actual and assumed characteristics of the at least two receivers and the at least two transmitters; and
    performing an inversion based at least in part on said compensated value to obtain a sub surface image,
    wherein said inversion employs a forward model that relates subsurface formation properties to said at least one compensated value.

2. The method of claim 1, wherein said compensated value compensates for inaccuracies including sensor gains and phase variations.

3. The method of claim 1, wherein said compensated value is expressible by the following equation $$\frac{V'_{ij}V'_{km}}{V'_{im}V'_{kj}},$$

wherein i and k are receiver indices and j and m are transmitter indices.

4. The method of claim 1, wherein said obtaining data further includes obtaining data from additional receivers in response to additional pairs of transmitters.

5. The method of claim 1, wherein said data is expressible as a complex value to represent gain and phase.

6. The method of claim 1, wherein the receivers include at least one of: a magnetic dipole, an electric dipole, spaced-apart electrodes.

7. The method of claim 1, wherein said image provides information about at least one formation property selected from a set of consisting of: acoustic velocity, attenuation, seismic reflectivity, and electromagnetic resistivity.

8. A system for improving image quality of crosswell tomography, comprising:
   a memory unit that stores inversion software; and
   a processor coupled to said memory to execute the software, wherein said software configures said processor to:
      obtain data from at least two receivers in response to transmissions from at least two transmitters, wherein one of said receivers or transmitters are in a borehole;
      derive at least one compensated value based on responses of said receivers to each of said transmitters that are combined as a ratio that cancels errors between actual and assumed characteristics of said receivers and said transmitters; and
      perform an inversion based at least in part on said compensated value to obtain a subsurface image.

9. The system of claim 8, further comprising a network electrically coupled to said processor, at least two transmitters, and at least two receivers, wherein at least one of said transmitters or one of said receivers is located inside said borehole.

10. The system of claim 8, wherein said network is electrically coupled to at least one sensor, at least one transmitter, and at least one receiver.

11. The system of claim 8, wherein said compensated value compensates for inaccuracies including sensor gains and phase variations.

12. The system of claim 8, wherein said compensated value is expressible by the following equation $$\frac{V'_{ij}V'_{km}}{V'_{im}V'_{kj}},$$

wherein i and k are receiver indices and j and m are transmitter indices.

13. The system of claim 8, wherein said software further configures the processor to obtain data from additional receivers in response to additional pairs of transmitters.

14. The system of claim 8, wherein said data is expressible as a complex value to represent gain and phase.

15. The system of claim 8, wherein said transmitters and receivers are distributed among two or more boreholes.

16. The system of claim 8, wherein said image provides information about at least one formation property selected from a set of consisting of: acoustic velocity, attenuation, seismic reflectivity, and electromagnetic resistivity.

17. The system of claim 8, wherein the transmitters and receivers are each coupled to an antenna, the antenna being in the set consisting of coils, solenoids, wire antennas, electrodes, gap antennas, and toroids.

* * * * *